Dec. 11, 1923.

L. FRITZ

SHAFT ALINEMENT GAUGE

Filed July 8, 1922

1,477,257

Witnesses:

Inventor
Lewis Fritz
By Joshua R.H. Potts
His Attorney

Patented Dec. 11, 1923.

1,477,257

UNITED STATES PATENT OFFICE.

LEWIS FRITZ, OF CHICAGO, ILLINOIS.

SHAFT-ALINEMENT GAUGE.

Application filed July 8, 1922. Serial No. 573,718.

*To all whom it may concern:*

Be it known that I, LEWIS FRITZ, a citizen of the United States, and a resident of the city of Chicago, county of Cook, and State of Illinois, have invented certain new and useful Improvements in Shaft-Alinement Gauges, of which the following is a specification.

My invention relates to shaft alinement gauges especially designed for testing the alinement of a crank shaft of a gasoline engine, and has for its principal object the provision of an improved construction of this character which will be highly efficient in use and economical in manufacture.

It has been found by experience that a mechanic has considerable trouble in alining a shaft with respect to its bearing and it is primarily my object to provide a gauge which will test and register the position in which the shaft lays in its bearing and to accomplish this object I provide a number of radially disposed gauge fingers, each having a graduated scale through the medium of which a mechanic is able to tell by observing the scales whether or not the shaft is in true alinement.

Other objects will appear hereinafter.

The invention consists in the combinations and arrangements of parts hereinafter described and claimed.

Figure 1:
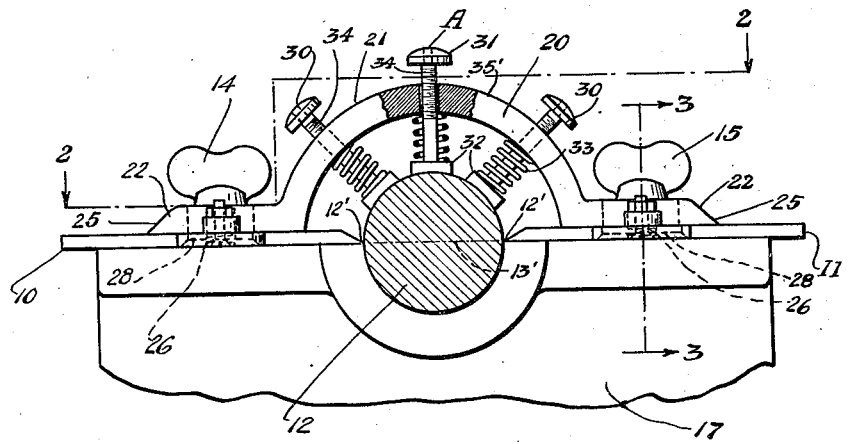
Figure 2:
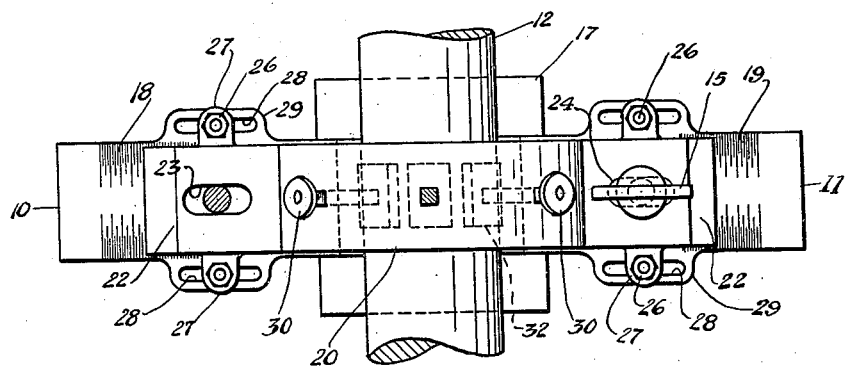
Figure 3:
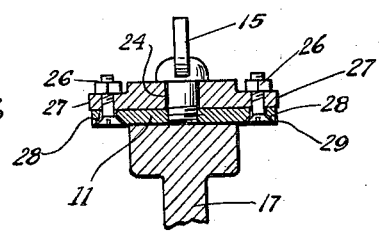

The invention will be best understood by reference to the accompanying drawings forming a part of this specification and in which, Fig. 1, is a vertical sectional detail view of a shaft showing a gauge embodying the invention applied thereto, Fig. 2, is a top plan view of the same taken substantially on line 2—2 of Fig. 1, and, Fig. 3, is a fragmentary detail view of the same taken substantially on line 3—3 of Fig. 1.

In carrying out the objects of my invention, I provide plate portions 10 and 11 adapted to be disposed on opposite sides of a shaft 12, as shown in Fig. 1, and adapted to rest on the bearing half 17 of an internal combustion engine. As shown in Fig. 1, the adjacent ends of the plate portions 10 and 11 have knife blade edges, indicated at 12', which are adapted to engage the shaft 12 in respect with its line of center, as indicated by dotted lines 13'. Adjacent the outer ends of the plates 10 and 11 are graduated scales 18 and 19, the purposes of which will be more fully hereinafter explained.

Associated with the plates 10 and 11 is an arched member 20 comprising a semi-circular portion 21 and opposite integral lateral projections 22, which are adapted to rest on the plate members 10 and 11 when in the position shown in Fig. 2, and be secured thereto by thumb bolts 14 and 15 which pass through elongated slots 23 and 24, as shown. This construction is such that the arched member 20 can be moved longitudinally with respect to the plates 10 and 11, when desired, or when necessary. The outer edges of the lateral projections 22 are bevelled, as at 25, to permit a more accurate observation of the scales 18 and 19 as will be hereinafter more readily understood. The arched member 20 is releasably fixed to the plate portions 10 and 11 through the medium of nut receiving bolts 26, which pass through lateral ears 27 formed on opposite sides of the lateral projections 22 and through elongated slots 28 formed in lateral projections 29 of the plate portions 10 and 11, as clearly illustrated Figs. 2 and 3.

In mounting the plate portions 10 and 11 in position the knife edges 12 and 12' are brought into contact with the shaft 12 and the arched member 20 is adjusted through the medium of the scales 18 and 19 so that the vertical line of center of the semi-circular portion 21 will be in true alinement with the vertical line of center of the shaft 12. After this has been accomplished the thumb bolts 14 and 15 are tightened to hold the arched member 20 in the proper adjusted position.

After mounting the gauge in the manner stated, I employ gauge fingers 30 and 31 which are carried by the semi-circular portion 21 of the arched member 20, as shown in Fig. 1, to determine whether the shaft 12 is in its proper position and true alinement, said gauge fingers being preferably square in cross section and provided with finger knobs (A) to facilitate manipulating the said fingers.

The inner ends of the gauge fingers are provided with seats 32 which are adapted to engage the shaft 12, as illustrated in Fig. 1, the shaft engaging sides of said seats being shaped to correspond with the shape of the shaft with which they engage. To retain the gauge fingers in contact with the shaft 12 I associate with the fingers expansive springs 33 which perform this function. The fingers are provided also with graduating scales 34, the purposes of which are as follows:

After the arched member 20 has been mounted in the position, herein stated, with respect to the shaft 12, the seats 32 of the gauge fingers will rest on the outer periphery of the shaft 12, as shown in Fig. 1. Now to determine whether or not the shaft is in its proper alinement the mechanic will observe the graduated scales of the fingers 30 and 31 and if he finds that the measurements of the gauges, using the outer surface 35 of the arched member as a measuring line, are not the same, he will know at once that the shaft 12 is not in proper alinement. Should the reading of the scale on one of the gauge fingers 30 differ from the reading of the scale of the other finger 30 the mechanic will at once know that the shaft is not in proper alinement or that the peripheral surface of the shaft is not true.

By placing one of my improved alinement gauges on each of a series of alined bearing blocks a shaft can be readily alined in true position with respect to the series of alined bearing blocks. By the use of my alinement gauge the necessity of mounting the shaft and alining the same with shims, which are mounted in the bearings, is obviated and the simplicity of the construction of the gauge is of such nature that the operation of the same, when in use, can be readily understood and the gauge can be manufactured at a nominal cost.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A gauge for the purposes herein set forth comprising plate portions adapted to be mounted into engagement with a shaft; a member fixed to the plate portions and having a portion in spaced relation with the shaft and provided with elements adapted to be radially disposed about the shaft and be releasably held in contact therewith.

2. A gauge for the purposes herein set forth comprising plates adapted to be disposed on opposite sides of a shaft and having knife edges for engagement therewith, and a member movably fixed to the plates and having a portion in spaced relation with the shaft and provided with elements adapted to be radially disposed about the shaft and be releasably held in contact therewith.

3. A gauge for the purposes herein set forth comprising plate portions adapted to be disposed on opposite corresponding sides of a shaft and provided with knife edges for engagement therewith, a member adapted to be mounted on the plate portion for adjustment relatively to said plate portion and having an arched portion in spaced relation with respect to the shaft; and elements carried by the arched portion adapted to be disposed radially about said shaft and releasably held in contact therewith, said elements being provided with operating knobs.

4. A gauge for the purposes herein set forth comprising members having end portions for engagement with a shaft on opposite corresponding sides thereof; a member having an arched portion, means adjustably securing the member to said members, elements carried by said member for engagement with the shaft, and resilient means for holding said elements in such engagement.

5. A gauge for the purposes herein set forth comprising adjustable plate portions adapted to engage a shaft; an arched member associated with said plate portions; means adjustably securing said plate portions and said arched member together; gauge fingers having graduated scales carried by said arched member, there being seats on said gauge fingers adapted to engage the periphery of said shaft; and a spring member associated with each of said fingers for retaining said seats in contact with said shaft.

6. A gauge of the class described comprising plate portions adapted to be mounted on a bearing block, there being a graduated scale on each of said plate portions; an arched member associated with said plate portions; means adjustably securing the plate portions and the arched member together; gauge fingers having graduated scales carried by said arched member; a seat formed on each of said gauge fingers for engagement with the periphery of a shaft journalled in said bearing block; and means for retaining said seats in contact with said shaft.

In testimony whereof I have signed my name to this specification in the presence of a subscribing witness.

LEWIS FRITZ.

Witness:
CLARENCE E. THREEDY.